United States Patent [19]

Akutsu et al.

[11] 4,297,310
[45] Oct. 27, 1981

[54] PROCESS FOR PRODUCING ELECTRIC CONDUCTORS COATED WITH CROSSLINKED POLYETHYLENE RESIN

[75] Inventors: Susumu Akutsu; Tsutomu Isaka; Mitsugu Ishioka, all of Yokkaichi, Japan

[73] Assignee: Mitsubishi Petrochemical Co., Ltd., Tokyo, Japan

[21] Appl. No.: 93,126

[22] Filed: Nov. 13, 1979

[30] Foreign Application Priority Data

Nov. 13, 1978 [JP] Japan .................. 53/139707

[51] Int. Cl.$^3$ .................. B29F 3/10; C08G 77/20
[52] U.S. Cl. .................. 264/83; 264/174; 264/236; 264/347; 525/326; 526/279; 528/32
[58] Field of Search .................. 264/174, 236, 347, 83; 526/279; 525/326; 528/32

[56] References Cited

U.S. PATENT DOCUMENTS

| | | | |
|---|---|---|---|
| 3,225,018 | 12/1965 | Zutty | 528/32 |
| 3,392,156 | 7/1968 | Donaldson | 526/279 |
| 3,859,247 | 1/1975 | MacKenzie, Jr. | 264/174 |
| 3,946,099 | 3/1976 | MacKenzie, Jr. | 264/174 |
| 3,957,719 | 5/1976 | MacKenzie, Jr. | 264/174 |
| 4,117,063 | 9/1978 | Voigt et al. | 264/174 |
| 4,117,195 | 9/1978 | Swarbrick et al. | 264/236 |
| 4,153,765 | 5/1979 | Tsai | 526/48.1 |

FOREIGN PATENT DOCUMENTS 1372453 10/1974 United Kingdom .
1415194 11/1975 United Kingdom .

Primary Examiner—Jeffery R. Thurlow
Attorney, Agent, or Firm—Robert E. Burns; Emmanuel J. Lobato; Bruce L. Adams

[57] ABSTRACT

A conductor wire is extrusion coated with a polyethylene resin containing a copolymer comprising predominantly ethylene and an unsaturated silane compound having the formula R Si R'$_n$Y$_{3-n}$, wherein: R is an ethylenically unsaturated hydrocarbyl group or hydrocarbyloxy group; R' is an aliphatic saturated hydrocarbyl group; Y is a hydrolyzable organic group; and n is zero, 1, or 2, thereby to fabricate a coated wire which is then caused to contact water in the presence of a silanol condensation catalyst in a crosslinking process step.

8 Claims, No Drawings

PROCESS FOR PRODUCING ELECTRIC CONDUCTORS COATED WITH CROSSLINKED POLYETHYLENE RESIN

BACKGROUND OF THE INVENTION

This invention relates generally to processes for producing electric wires and cables or conductors coated with a crosslinked polyethylene resin. More specifically, the invention relates to a process for producing coated electric wires and cables (hereinafter referred to collectively as coated "wire(s)" or "conductor(s)") which process comprises extrusion-coating an electric conductor with a copolymer of ethylene and an ethylenically unsaturated silane compound having a hydrolyzable silane group as a crosslinkable group, and converting the copolymer into a crosslinked structure.

A generally practiced method of improving the physical properties, particularly heat resistance, of a coated wire having an electric conductor coated with a coating layer comprising a polyolefin such as polyethylene is to cause crosslinking of this polyolefin.

One known measure for carrying out this crosslinking is to render the polyolefin to be used crosslinkable beforehand by introducing thereinto a crosslinkable group. In this case, the utilization of a hydrolyzable silane group as the crosslinkable group is known. More specifically, the process comprises preparing a graft copolymer by reacting the polyolefin and an ethylenically unsaturated silane compound in the presence of a free radical generating agent, extrusion-coating a composition comprising this graft copolymer and a silanol condensation catalyst on an electric conductor thereby to produce a coated wire, and causing this coated wire to contact water thereby to cause the graft copolymer to undergo crosslinking.

While this process is accompanied by a problem in that a special process step for grafting beforehand the unsaturated silane compound is necessary, and a general-purpose polyolefin cannot be used as it is, it is more advantageous than other crosslinking processes such as, for example, that depending on radiation and that comprising compounding an organic peroxide with the polymer beforehand and then decomposing the peroxide. More specifically, the radiation process requires special and expensive apparatus and, in addition, cannot produce coated wires of thick coating in actual practice, while the peroxide process is accompanied by problems such as generation of bubbles in the coating due to decomposition gases, whereby difficulties are encountered in obtaining crosslinked coating layers of uniform quality, particularly in the case of thin coatings.

However, there have been problems in the use of these unsaturated silane compound-grafted polyolefins also, That is, the surface characteristics of products of these graft polyolefins are not necessarily good in all cases. This problem becomes seriously pronounced when the line speed of extrusion is high. However, needless to say, a high extrusion line speed is desirable from the industrial viewpoint. Consequently, this problem of poor surface characteristics including rough surface texture is not negligible.

This problem of poor surface characteristics is serious, not only on the point merely of commodity value of the product, but also on the point, for example, of the insulation characteristic of an insulated wire which is the product in the case where, over the crosslinked coating layer, a further coating layer is applied to form an insulating layer, the surface of which must be smooth for good insulation characteristic. These surface characteristics depend on the degree of crosslinking and can be improved by a lowering of the degree of crosslinking, but this gives rise to a simultaneous deterioration of the heat resistance of the coating. Accordingly, this improvement measure cannot be resorted to. Furthermore, the use of these graft polyolefins has given rise to a problem in that, in continuous extrusion forming of the coated wire over a long period, the quantity of the extruded resin decreases with the passage of time, which in turn may lead to trouble such as impossibility of extrusion.

SUMMARY OF THE INVENTION

It is an object of this invention to solve the above described problems in the production of wires coated with a crosslinked polyethylene resin. We have found that this object can be achieved by a process wherein an ethylenically unsaturated silane compound is not caused to undergo graft copolymerization onto a polyethylene but is used as essentially a random copolymer with ethylene.

According to the invention, briefly summarized, there is provided a process for producing electric conductors coated with a crosslinked polyethylene resin which comprises fabricating a coated electric conductor having an extrusion-coated layer of a polyethylene resin comprising a copolymer on a conductor, the copolymer comprising predominantly units of ethylene and an unsaturated silane compound represented by the formula $RSiR'_nY_{3-n}$, wherein: R is a member selected from the group consisting of ethylenically unsaturated hydrocarbyl and hydrocarbyloxy groups; R' is an aliphatic saturated hydrocarbyl group; Y is a hydrolyzable organic group; and n is zero, 1, or 2, and subjecting the coated conductor to a crosslinking process step comprising causing the coated conductor to contact water in the presence of a silanol condensation catalyst.

In this disclosure, the term "copolymers" or "copolymerization" does not include graft copolymers and graft copolymerization. However, it does not exclude graft copolymers which may unavoidably be produced when the "random" copolymers are produced.

Thus, in accordance with this invention, the above described problems of poor surface characteristics and decrease in quantity of extruded resin with elapse of time, accompanying products in which graft copolymers are used, are overcome and, moreover, an improvement in the electrical characteristics is achieved by using, for at least one layer or one part of the coating layer, polyethylene resins into which unsaturated silane compounds have been introduced, not by grafting, but by random copolymerization. Copolymers of ethylene and the above described unsaturated silane compounds per se are known (as disclosed in the specifications of U.S. Pat. Nos. 3,225,018 and 3,392,156), but that the above described problems can be solved by using these copolymers and by causing them to undergo crosslinking according to this invention was an unexpected result.

In the case of the polyethylene resin used in this invention, there is no grafting step, but, instead, a polyethylene with which an unsaturated silane compound has been copolymerized must be separately prepared. However, because the quantity of the unsaturated silane compound used is small, among other reasons, this copolymerization can be carried out by a process which is substantially the same, operationally, as homopolymerization of ethylene and is adoptable as a part in the diversification of polyethylenes.

The nature, utility, and further features of this invention will be more clearly apparent from the following detailed description beginning with a consideration of the general aspects of the invention and concluding with specific examples of practice illustrating preferred embodiments of the invention and comparison examples.

DETAILED DESCRIPTION OF THE INVENTION

1. Copolymer principally comprising ethylene and an unsaturated silane compound

The unsaturated silane compound is represented by the following formula.

$$RSiR'_nY_{3-n},$$

where: R represents an ethylenically unsaturated hydrocarbyl or hydrocarbyloxy group; R' represents an aliphatic saturated hydrocarbyl group; Y represents a hydrolyzable organic group; and n represents zero, 1, or 2. When there are a plurality of Y groups, they need not be identical.

Specific examples of this unsaturated silane compound are those wherein: R is a vinyl, allyl, isopropenyl, butenyl, cyclohexenyl or γ-(meth)acryloyloxypropyl group; Y is a methoxy, ethoxy, formyloxy, acetoxy, propionyloxy, or an alkyl- or aryl-amino group; and R' is a methyl, ethyl, propyl, decyl, or phenyl group.

A particularly preferred unsaturated silane compound is represented by the formula $$CH_2=CHSi(OA)_3,$$

where A is a hydrocarbyl group having 1 to 8 carbon atoms, preferably 1 to 4 carbon atoms.

The most preferred compounds are vinyltrimethoxysilane, vinyltriethoxysilane, and vinyltriacetoxysilane.

The copolymerization of ethylene and the unsaturated silane compound can be carried out under any suitable conditions which will bring about the copolymerization of the two monomers.

In addition, the copolymerization can be carried out in the presence of another comonomer which is copolymerizable with the two monomers. Examples of such comonomers are vinylesters such as vinylacetate, vinylbutyrate, vinylpivalate and the like; (meth)acrylic esters such as methyl(meth)acrylate, butyl(meth)acrylate, and the like; olefinically unsaturated carboxylic acids such as (meth)acrylic acid, maleic acid, fumaric acid and the like; derivatives of (meth)acrylic acid such as (meth)acrylamide, (meth)acrylonitrile and the like; and vinylethers such as vinylmethylether, vinylphenylether and the like.

Specific examples of the copolymerization conditions are: a pressure of 500 to 4,000 kg/cm², preferably 1,000 to 4,000 kg/cm²; a temperature of 100° to 400° C., preferably 150° to 350° C.; the presence of a radical polymerization initiator and a chain transfer agent if necessary; the use of an autoclave or tubular reactor, preferably an autoclave reactor, for the copolymerization; and the contacting of the two monomers at the same time or stepwisely in the reactor.

In the process of this invention, any radical polymerization initiator and any chain transfer agent whose use in the polymerization or copolymerization of ethylene is known can be used. Examples of such polymerization initiators are: organic peroxides such as lauroyl peroxide, dipropionyl peroxide, benzoyl peroxide, di-t-butyl peroxide, t-butylhydroperoxide, and t-butylperoxyisobutyrate; molecular oxygen; and azo compounds such as azobisisobutyronitrile and azoisobutylvaleronitrile. Examples of such chain transfer agents are: paraffinic hydrocarbons such as methane, ethane, propane, butane, and pentane; α-olefins such as propylene, butene-1, and hexene-1; aldehydes such as formaldehyde, acetaldehyde, and n-butylaldehyde; ketones such as acetone, methylethylketone, and cyclohexanone; aromatic hydrocarbons; and chlorinated hydrocarbons.

In the copolymer used in this invention, the content of the unit of the unsaturated silane compound is 0.01 to 15 percent, preferably 0.1 to 5 percent, particularly preferably 0.2 to 2 percent, all percentages being by weight. The remainder is ethylene by itself or ethylene and a small quantity of a copolymerizable monomer such as that mentioned above. In general, a crosslinked product of the copolymer of high content of an unsaturated silane compound has excellent mechanical strength and heat resistance, but if this content is excessively high, the tensile elongation, electrical characteristics, and the surface characteristics of a coating layer thereof will be poor. The above mentioned content range of 0.01 to 15 percent by weight was determined from this consideration.

2. Silanol condensation catalyst

In general, a silanol condensation catalyst which is suitable for use as a catalyst for promoting the dehydration-condensation of a silicone in terms of its silanol groups is suitable for use in this invention. A silanol condensation catalyst of this character is, in general, carboxylates of metals such as tin, zinc, iron, lead, and cobalt; organic bases; inorganic acids; and organic acids.

Specific examples of silanol condensation catalysts are dibutyltin dilaurate, dibutyltin diacetate, dibutyltin dioctanoate, stannous acetate, stannous caprylate, lead naphthenate, zinc caprylate, cobalt naphthenate, ethylamines, dibutylamines, hexylamines, pyridine, inorganic acids such as sulfuric acid and hydrochloric acid, and organic acids such as toluenesulfonic acid, acetic acid, stearic acid, and maleic acid.

The quantity in which this silanol condensation catalyst is used can be appropriately determined for the given catalyst with respect to the given copolymer with reference to the examples set forth hereinafter. Generally speaking, however, this quantity of the catalyst is of the order of 0.001 to 10 percent, preferably 0.01 to 5 percent, particularly preferably 0.03 to 3 percent, all percentages being by weight, of the total weight.

3. Composition preparation and extrusion-coating

A composition for coating wires can be prepared by any suitable means which can be used for adding various additives to thermoplastic resins.

Any of various processes can be used for preparing this composition for wire coating. In general, this process involves the melting or dissolving (particularly the former) of the copolymer of ethylene and the unsaturated silane compound or a silanol condensation catalyst. For example, the copolymer and preferably a silanol condensation catalyst (as it is or in the form of a solution or a dispersion) together with ancillary materials to be blended as necessary are kneaded in an extruding machine, and the resulting composition is extrusion-coated as a single layer or in a laminated state with one or more other materials on a conductor through the use of an ordinary wire coating apparatus. The term "conductor" as used herein is intended to mean not only a bare wire but also a metal wire already having thereon a coating layer. That is, the "coating layer" according to this invention is intended to mean any of various coating layers such as, for example, electrically insulating layers, semiconductive layers, and protective coating layers for conductors such as single-core and multiple-core conductors and those of coaxial configuration.

Furthermore, as mentioned hereinbefore, the silanol condensation catalyst is used in a smaller quantity than the copolymer. Accordingly, when the silanol condensation catalyst is to be added to the copolymer beforehand, a convenient procedure is to prepare a master batch in which the silanol condensation catalyst is compounded in a high concentration with a dispersion medium such as a polyethylene, as is frequently done in the adding of small-quantity ingredients, and then blending this master batch into the copolymer so that the specified catalyst concentration is attained.

4. Crosslinking

The crosslinking is accomplished by the reaction of the hydrolyzable group Y of the unsaturated silane compound copolymerized with ethylene with water, which reaction is promoted by the silanol condensation catalyst.

Depending on how the silanol condensation catalyst is utilized, there are a number of modes in which this invention can be practiced. More specifically, the phrase "... and subjecting the coated conductor to a crosslinking process step comprising causing the coated conductor to contact water in the presence of a silanol condensation catalyst." set forth hereinbefore means any of a number of suitable modes of practice, principal examples of which are as follows.

(1) The mode of adding beforehand the silanol condensation catalyst to the polyethylene resin comprising this copolymer (accordingly, the procedure of "... fabricating a coated electric conductor having an extrusion-coated layer of a polyethylene resin comprising a copolymer on a conductor ..." is also intended to include this mode) and causing the coated wire to contact water.

(2) The mode of causing a coated wire obtained without adding beforehand the catalyst to contact a solution or a dispersion of the catalyst thereby to cause the coating layer to be coated or impregnated with the catalyst and thereafter causing the coating layer to contact water similarly as in the case where the catalyst is added beforehand.

(3) The mode of causing a coated wire obtained without adding beforehand a catalyst to contact an aqueous solution or aqueous dispersion of the catalyst thereby to cause crosslinking at one stroke.

The contacting with water or exposure to water is suitably carried out by causing the formed coated wire to contact water (liquid or vapor) at a temperature of the order of from room temperature to 200° C, ordinarily of the order of from room temperature to 100° C. for a period of the order of from 10 seconds to one week, ordinarily of the order of from one minute to one day. Contacting with water under an absolute pressure higher than atmospheric pressure can also be carried out. In order to improve the wetting of the formed article, the water may contain a wetting agent or surfactant, a water-soluble organic solvent, or the like. The water may be in the form of ordinary water, or it may be in another form such as heated steam or moisture in air.

In order to indicate more fully the nature and utility of this invention, the following specific examples of practice constituting preferred embodiments of the invention and comparison examples are set forth, it being understood that these examples are presented as illustrative only and are not intended to limit the scope of the invention. Throughout these examples, quantities expressed in percent are by weight.

EXAMPLES 1, 2, 3, and 4

Into a stirred autoclave of a capacity of 1.5 liters (l.), a mixture of ethylene, vinyltrimethoxysilane and propylene as a chain transfer agent was charged. t-Butyl peroxyisobutyrate was added as a polymerization initiator to the mixture, which was subjected to a pressure of 2,400 kg/cm$^2$ and a temperature of 220° C. Under these conditions and other conditions as shown in Table 1 ethylene-vinyltrimethoxysilane copolymers were continuously synthesized. The copolymers thus formed were found to be almost odorless and to have the characteristics set forth in Table 1.

Into each of these copolymers, 5 percent of a master batch of 1 percent of dibutyltin dilaurate compounded with low density polyethylene was blended. Then the resulting blends were used to form coating layers of 0.2-mm thickness on a conductor of 0.4-mm diameter by means of a wire coating apparatus of an L/D ratio of 25 and a diameter of 50 mm at an extrusion temperature of 190° C. and extrusion speeds of 200, 400, and 600 meters/min. The articles thus formed were thereafter immersed for 5 hours in warm water at 80° C. thereby to carry out crosslinking processing. The surface characteristics of the products thus obtained were as indicated in Table 2.

Separately, 5 percent of the above specified master batch was blended into each of the copolymers obtained in the aforedescribed manner. After each of the resulting blends was milled for 7 minutes in a roll mill at 120° to 125° C., it was formed into a pressed sheet of 1-mm thickness, which was immersed for 5 hours in warm water at 80° C. thereby to carry out crosslinking processing. The electrical characteristics and the heat resistances of the samples thus obtained were as set forth in Table 3.

COMPARISON EXAMPLES 1, 2, AND 3

Into a low-density polyethylene ("Yukalon" EH-30 produced by Mitsubishi Petrochemical Company) having a melt index of 2 g/10 min. and a density of 0.919 g/cc, 2 percent of vinyltrimethoxysilane was blended. Then, into three lots of the resulting blend, dicumyl peroxide was blended respectively in the quantities of 0.1, 0.13, and 0.06 percent. The three blends thus obtained were caused to undergo graft polymerization at an extrusion temperature of 200° C. by means of an extruder of an L/D ratio of 24 and a 50-mm diameter.

The grafted polyethylenes thus formed respectively had melt indexes of 1.3, 1.0, and 1.6 g/10 min. and respectively had silane contents of 0.72, 0.91, and 0.48 percent.

The grafted polyethylenes thus obtained were formed and caused to undergo crosslinking by the procedure specified in Examples 1 through 4. Surface characteristics of the coated wires thus obtained are shown in Table 2, and their electrical characteristics and heat resistances are shown in Table 3.

EXAMPLE 5, COMPARISON EXAMPLE 4

With the use of the same compositions as in Example 1 and Comparison Example 1, respectively, coated wires were continuously formed for 48 hours by the process of Examples 1 through 4 at an extrusion line speed of 200 meters/min. The rotational speed of the screw of the extruder during this process was maintained at the value at the time of starting of the forming. The variations with passage of time of the extrusion quantities during this process are shown in Table 4.

TABLE 1

Polymerization conditions and characteristics of copolymer formed

| | Polymerization conditions | | | | | | Copolymer characteristics | |
|---|---|---|---|---|---|---|---|---|
| Example | Pressure Kg/cm$^2$ | Temperature °C. | Ethylene feed rate Kg/hr | Vinyl silane feed rate g/hr | Propylene feed rate l/hr | Initiator feed rate g/hr | Ethylene conversion % | Melt[*1] index g/10 min. | Vinyl[*2] silane content % by weight |
| 1 | 2400 | 220 | 43 | 60 | 500 | 1.9 | 15 | 1.0 | 0.24 |
| 2 | 2400 | 220 | 43 | 95 | 450 | 2.0 | 15 | 1.0 | 0.34 |
| 3 | 2400 | 220 | 43 | 150 | 400 | 2.3 | 15 | 1.0 | 0.57 |
| 4 | 2400 | 220 | 43 | 190 | 400 | 2.4 | 15 | 1.0 | 0.72 |

[*1]Test method: Japanese Industrial Standards, JIS K 6760, ("Testing methods for polyethylene")
[*2]Analysis by fluorescent X rays.

TABLE 2

Surface characteristics of coated wires

| | Surface roughness[*3] | | | |
|---|---|---|---|---|
| | Extrusion line speed 200 m/min. μ | Extrusion line speed 400 m/min. μ | Extrusion line speed 600 m/min. μ | Gel content[*4] % by wt. |
| Example 1 | 1.3 | 1.5 | 1.6 | 65 |
| Example 2 | 1.4 | 1.6 | 1.9 | 73 |
| Example 3 | 1.6 | 1.9 | 2.4 | 81 |
| Example 4 | 1.6 | 2.1 | 3.1 | 86 |
| Comparison Example 1 | 1.9 | 2.5 | 3.5 | 63 |
| Comparison Example 2 | 2.9 | 4.1 | 5.4 | 79 |
| Comparison Example 3 | 1.3 | 1.5 | 1.8 | 45 |

[*3]Test method: measured surface roughness of insulated wire according to JIS B 0601 ("Surface roughness") by means of surface roughness meter Model SE-3B manufactured by K. K. Kosaka Kenkyusho, Japan, and determined average roughness (RZ) of 10 points.
[*4]Test method: xylene boiling point extraction, 10 hours.

TABLE 3

Electrical characteristics and heat resistance

| | Dielectric[*5] loss tangent (1MHz) | Dielectric[*6] constant (1MHz) | Rate of heat[*7] distortion % | Gel content[*4] % by wt. |
|---|---|---|---|---|
| Example 1 | 2 × 10$^{-4}$ | 2.25 | 36 | 64 |
| Example 2 | 2 × 10$^{-4}$ | 2.25 | 26 | 73 |
| Example 3 | 3 × 10$^{-4}$ | 2.26 | 19 | 79 |
| Example 4 | 4 × 10$^{-4}$ | 2.27 | 13 | 87 |
| Comparison Example 1 | 4 × 10$^{-4}$ | 2.28 | 34 | 63 |
| Comparison Example 2 | 7 × 10$^{-4}$ | 2.30 | 23 | 80 |
| Comparison Example 3 | 2 × 10$^{-4}$ | 2.25 | 61 | 45 |

[*5], [*6]Test method: measured according to JIS K 6760.
[*7]Test method: measured according to JIS C 3005 ("Testing methods for plastic insulated wires and cables").

TABLE 4

| | Continuous extrusion characteristics | | | | |
|---|---|---|---|---|---|
| | Start of forming | 10 hrs. later | 20 hrs. later | 30 hrs. later | 40 hrs. later |
| Example 5 | 16.7 | 16.7 | 16.4 | 16.2 | 16.1 |
| Comparison Example 4 | 16.6 | 16.4 | 15.5 | 14.5 | 13.4 |

What is claimed is:

1. A process for producing electric conductors coated with a crosslinked polyethylene resin which comprises fabricating a coated electric conductor having an extrusion-coated layer of a polyethylene resin comprising a random copolymer on a conductor, the copolymer comprising predominantly units of ethylene monomer and an unsaturated silane monomer represented by the formula $RSiR'_nY_{3-n}$, wherein: R is a member selected from the group consisting of ethylenically unsaturated hydrocarbyl and hydrocarbyloxy groups; R' is an aliphatic saturated hydrocarbyl group; Y is a hydrolyzable organic group; and n is zero, 1, or 2, and subjecting the coated conductor to a crosslinking process step comprising causing the coated conductor to contact water in the presence of a silanol condensation catalyst, said random copolymer having been produced by the polymerization of said monomers in the presence of a radical initiator under elevated pressure.

2. A process according to claim 1 in which the unsaturated silane compound is a compound selected from the group consisting of vinyltrimethoxysilane, vinyltriethoxysilane, and vinyltriacetoxysilane.

3. A process according to any one of claims 1 through 2 in which the unsaturated silane compound is used in quantity of 0.01 to 15 percent by weight of the quantity of the copolymer.

4. A process according to any one of claims 1 or 2 in which the silanol condensation catalyst is added beforehand to the polyethylene resin comprising the copolymer prior to the fabricating of the coated conductor having the extrusion-coated layer of the polyethylene resin comprising the copolymer on the conductor.

5. A process according to any one of claims 1 or 2 in which the electric conductor is bare prior to the coating thereof with the polyethylene resin.

6. A process according to any one of claims 1 or 2 in which the electric conductor has been previously coated with at least one layer of a coating material prior to the coating thereof with the polyethylene resin.

7. A process according to claim 6 in which the previously-coated layer has been crosslinked prior to the fabricating thereof with the polyethylene resin.

8. A process according to claim 1 in which the copolymer is produced under a pressure of about 500 to 4000 kg/cm$^2$.

* * * * *

REEXAMINATION CERTIFICATE (1096th)

United States Patent [19]

Akutsu et al.

[11] B1 4,297,310

[45] Certificate Issued Jul. 11, 1989

[54] PROCESS FOR PRODUCING ELECTRIC CONDUCTORS COATED WITH CROSSLINKED POLYETHYLENE RESIN

[75] Inventors: Susumu Akutsu; Tsutomu Isaka; Mitsugu Ishioka, all of Yokkaichi, Japan

[73] Assignee: Mitsubishi Petrochemical Co., Ltd., Tokyo, Japan

Reexamination Request:
No. 90/001,538, Jun. 22, 1988

Reexamination Certificate for:
Patent No.: 4,297,310
Issued: Oct. 27, 1981
Appl. No.: 93,126
Filed: Nov. 13, 1979

[30] Foreign Application Priority Data

Nov. 13, 1978 [JP] Japan ................ 53-139707

[51] Int. Cl.$^4$ ............................................. B29E 47/02
[52] U.S. Cl. ................................... 264/83; 264/174; 264/236; 264/347; 525/326; 526/279; 528/32

*Primary Examiner*—Jeffery Thurlow

[57] ABSTRACT

A conductor wire is extrusion coated with a polyethylene resin containing a copolymer comprising predominantly ethylene and an unsaturated silane compound having the formula R Si R'$_n$Y$_{3-n}$, wherein: R is an ethylenically unsaturated hydrocarbyl group or hydrocarbyloxy group; R' is an aliphatic saturated hydrocarbyl group; Y is a hydrolyzable organic group; and n is zero, 1, or 2, thereby to fabricate a coated wire which is then caused to contact water in the presence of a silanol condensation catalyst in a crosslinking process step.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–3 and 8 are cancelled.

Claims 4–7 are determined to be patentable as amended.

New claims 9–12 are added and determined to be patentable.

4. A process according to [any one of claims 1 or 2] *claim 9* in which the silanol condensation catalyst is added beforehand to the polyethylene resin comprising the copolymer prior to the fabricating of the coated conductor having the extrusion-coated layer of the polyethylene resin comprising the copolymer on the conductor.

5. A process according to [any of claims 1 or 2] *claim 9* in which the electric conductor is bare prior to the coating thereof with the polyethylene resin.

6. A process according to [any one of claims 1 or 2] *claim 9* in which the electric conductor has been previously coated with at least one layer of a coating material prior to the coating thereof with the polyethylene resin.

7. A process according to claim [6] *9* in which the previously-coated layer has been crosslinked prior to the fabricating thereof with the polyethylene resin.

*9. A process for producing electric conductors coated with a crosslinked polyethylene resin which comprises:*

*fabricating a coated electric conductor having an extrusion-coated layer of a polyethylene resin comprising:*
*a random copolymer on a conductor;*
*the copolymer comprising:*
*predominantly units of ethylene monomer and 0.1–5% by weight based on the weight of the copolymer of vinyltrimethoxysilane,*
*said copolymer being obtained by radical copolymerization of said ethylene and said silane compound, in the presence of a radical initiator under a pressure of 500 to 4000 kg/cm², and*
*a temperature of 100° to 400° C., and*
*subjecting the coated conductor to a crosslinking process step comprising:*
*causing the coated conductor to contact water in the presence of 0.03 to 3% by weight based on the total weight of a silanol condensation catalyst.*

*10. A process according to claim 9 wherein the copolymerization reaction pressure ranges from 1,000 to 4,000 kg/cm².*

*11. A process according to claim 9 wherein the copolymerization reaction temperature ranges from 150° to 350° C.*

*12. A process according to claim 9 wherein the silanol condensation catalyst is present in the amount of 0.2 to 2% by weight.*

* * * * *